Jan. 27, 1970  A. E. WILLIS  3,491,429
METHOD OF CONSTRUCTION OF A RATE GYROSCOPE
Filed Aug. 31, 1967

INVENTOR.
ALAN E. WILLIS
BY
Davis, Hoxie, Faithfull & Hapgood
ATTORNEYS

United States Patent Office 3,491,429
Patented Jan. 27, 1970

3,491,429
METHOD OF CONSTRUCTION OF A RATE GYROSCOPE
Alan E. Willis, Stamford, Conn., assignor to The United States Time Corporation, Waterbury, Conn., a corporation of Connecticut
Filed Aug. 31, 1967, Ser. No. 664,857
Int. Cl. G01c *19/02;* C21d *1/00;* B23p *19/00*
U.S. Cl. 29—436                                          6 Claims

ABSTRACT OF THE DISCLOSURE

A rate gyroscope is constructed with a gimbal suspended by a torsion bar which acts as its return spring. The bar is heat-treated in place, after assembly of the gyro, to relieve its internal stresses. The heating is accomplished by passing a rapid electric current through the torsion bar and the parts of the gyro connected to it. The bar preferably is heat-treated at the null and center positions of the gimbal and its armature.

---

Figure 1:
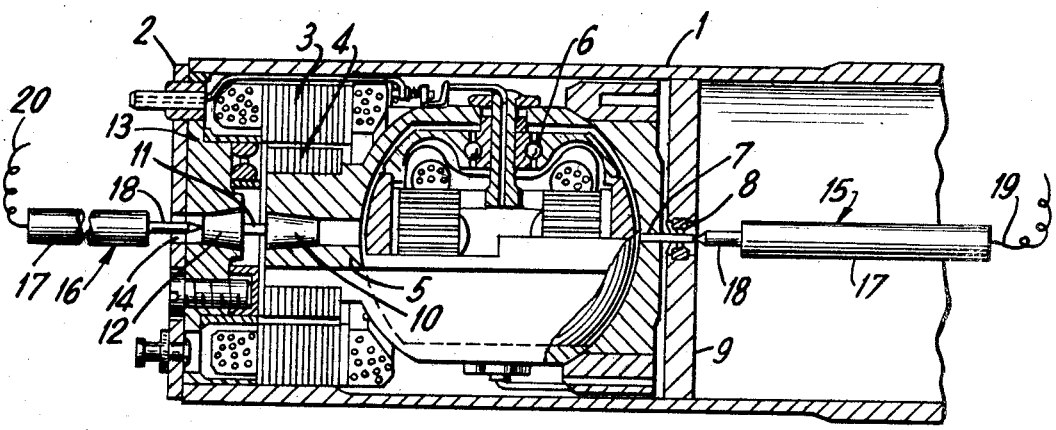

The present invention relates to measuring instruments and more particularly to a method of constructing a rate gyroscope.

A rate gyroscope is a measuring instrument used to determine the rate and amount of change of directional forces. Rate gyroscopes are used in airplane navigation systems, for example in automatic pilots, in guided missiles, and in other guidance systems. Usually the gyroscope construction includes a housing, a motor driven rotor, a gimbal rotatably supporting the rotor, and a pick-off. The pick-off converts the mechanical movement of the gimbal into an electrical signal. The pick-off may include an armature fixed to the gimbal and a stator fixed to the housing.

In one type of rate gyroscope the gimbal is fastened, at one of its ends, to a torsion bar which suspends the gimbal within the housing and restrains it in its rotation. The other end of the gimbal may turn in a ball bearing or be suspended by a second torsion bar. The torsion bar (spring) is formed from round metal stock. Internal stresses have been imparted to the metal stock and to the torsion bar in the course of its rolling, machining, or otherwise forming operations.

The torsion bar, if it is treated so that it becomes stress-free and if it is formed of certain selected alloys, may exhibit a low hysteresis. By low hysteresis is meant that after turning the bar through an angle by torque applied by the gimbal, the bar will return through very nearly the same angle (usually differing by less than 0.1%) to almost the same starting position. Such low hysteresis is possible when energy is not lost in overcoming the internal stresses of the metal of the torsion bar. The stresses induced in the torsion bar due to its working, i.e., its history of processing, may cause the bar to exhibit an undesirably high hysteresis.

One proposed solution to this problem is to heat-treat the bar, for example at about 1000° F., to relieve its internal stresses prior to the bar being fastened to its gimbal. When the gimbal is assembled in the gyro, it may produce a signal in the pick-up without the presence of a force on the gyro. The gimbal is said to be not nulled at its zero position. The gyro may be nulled, sometimes, by twisting the gimbal until sufficient stress is created in the torsion bar to keep the gimbal at its null. However, that stress results in a high and undesirable hysteresis in the bar. In addition, when the gimbal is assembled in its housing, it may happen that the armature of the pick-off attached to the gimbal is not perfectly centered within its stator. The armature can be centered by pushing the gimbal and its torsion bar to one side until the alignment is obtained. However, the torsion bar, after such an alignment or centering, has had stresses induced in it and may exhibit high and undesirable hysteresis. Consequently, even when the torsion bar has been heat-treated prior to its assembly in the gyro to make it stress-free, additional stresses are induced in the bar after its assembly in the gyro because of the procedures required to null the gyro and to center the gimbal's rotor in its stator. It would be impossible to heat-treat the bar in place after assembly of the gyro by heating the entire gyro. The high temperature would ruin the gyro, for example by burning or melting the insulation on the coils.

It is the objective of the present invention to provide a method of constructing a rate gyroscope having a torsion bar in which the bar is free from internal stresses and in which the gimbal's armature is centered in its stator and in which the gimbal is normally at its null.

In accordance with the present invention, a rate gyroscope having a torsion bar suspension is partially assembled with its gimbal in place. The rotor, attached to one end of the gimbal, is centered by applying lateral force. The gimbal is nulled, which results in twisting the torsion bar. At the same time probes are applied to both ends of the bar or to structures connected to those ends. A rapid high electrical current passes through the probes and the bar. The neck of the bar, which is the thinnest part between the probes, heats up and is annealed. The torsion bar is thus heat-treated in place, the gimbal is nulled and centered and the torsion bar is made stress-free.

Figure 2:
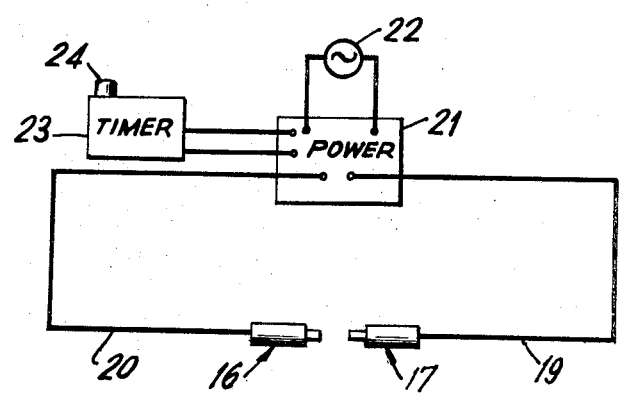

Other objectives of the present invention will be apparent from the below-described embodiment taken in conjunction with the accompanying drawings, in which:

FIG. 1 shows, in cross-section, a partially assembled rate gyroscope with the heating probes touching parts of the gyro; and FIG. 2 is a block circuit diagram of the preferred mechanism to pass electrical current to the probes.

The rate gyroscope shown in FIG. 1 is of conventional construction, although it should be understood that the method of the present invention is equally applicable in other similar instruments using a torsion bar suspension, such as accelerometers and gas-driven rate gyroscopes.

The rate gyroscope consists of a cylindrical housing 1 having an end (header) plate 2. A fixed stator 3 is secured to the housing 1 and consists of a plurality of laminated metal plates having internal teeth. A fine wire coil is wound about the teeth. The stator 3 cooperates with a movable armature 4, which consists of laminated metal plates, to form the microsyn pick-off of the gyroscope. Other types of pick-offs, such as sliding resistances, may also be used in connection with the present invention. The microsyn armature 4 is connected near one end of the gimbal 5. A rotor 6, driven by an internal electric motor, is rotatably suspended by bearings within the gimbal 5. One end of the gimbal 5 terminates in a shaft 7 which rotates in a ball bearing 8 whose outer race is fixed to a support 9 attached to the housing 1.

The opposite end of the gimbal from bearing 8 is secured to a first head 10 of a torsion bar 11. Preferably the torsion bar 11 is round in its cross-section; however, other types of torsion bars such as one or more rectangular, flat or triangular springs may be used. The material of the torsion bar is preferably a material exhibiting low hysteresis after heat-treatment, such as "Elgiloy," a trademark of the Elgin National Watch Company for its steel alloy, or a similar chrome, nickel, cobalt steel alloy.

The center or neck of the torsion bar is relatively thin and elongated compared to its two heads. The second head 12 of the torsion bar 11 is fastened in the support structure 13. The structure 13 is fixed to the housing 1 and the header plate 2 and has a central hole 14.

As shown in FIG. 1, a first electrical probe 15 is touched against the end of shaft 7. A second electrical probe 16 is positioned within hole 14 and is touched against head 12 of torsion bar 11. The probes preferably have electrically insulative cylindrical handles 17 and electrically conductive pointed rods 18. The rear end of the rod of probe 15 is connected to wire 19 and the rear end of the rod of probe 16 is connected to wire 20.

The electrical mechanism to supply a rapid strong electrical current across probes 15 and 16 is shown in FIG. 2. The wires 19 and 20 lead to the output terminal of current regulated power supply 21. Power supply 21 furnishes 15 amps A.C. of electrical current, although D.C. current may also be used. The power supply 21 is connected to a power source 22 and to a timer 23. Timer 23, which is operated by switch 24, controls the "on" time of the power supply 21. When switch 24 is depressed, the timer causes power to flow from supply 21. The "on" time is less than a second, preferably one-half of a second, i.e., 30 cycles of the conventional 60-cycle A.C. current. The length of time and the current is a function of the resistance of the neck portion of the torsion bar. If the neck portion is thicker, lowering its resistance and raising the volume to be heated, then more current or a longer time period of current flow, or both, must be used. The gyroscope is electrically insulated during the time of the heat treatment.

It is important to keep the current flow sufficiently short in period and low in power so that the other parts of the gyroscope, such as shaft 7, do not become unduly heated.

The neck portion of the torsion bar is the thinnest member between the probes. It heats up, due to resistance heating, and is stress-relieved, before the other portions of the gyroscope become heated.

Modifications may be made in the invention within the scope of the subjoined claims. For example, in a gyroscope in which both ends of the gimbal are suspended by torsion bars, both bars may be heat-treated and stress-relieved simultaneously by touching their outer heads, at the same time, with electric probes and passing electrical current through the bars.

Having thus described my invention, I claim:

1. The process of constructing a rate gyroscope, the gyroscope consisting of a housing, a gimbal suspended within the housing by at least one torsion bar, a rotor rotatably suspended within said gimbal and pick-off means to convert movement of the gimbal to an electrical signal, the process including the steps of at least partly assembling said gimbal within said housing with one end of said torsion bar fixedly secured to said housing and the other end fixedly secured to said gimbal and subsequently applying an electrical current through said torsion bar, said current being of a sufficient power and duration to heat said bar to a stress-relieving temperature.

2. The process of claim 1 wherein said current is applied through said torsion bar by means of touching electrically conductive rods to the two opposite ends of said bar or to electrically conductive parts of the gyroscope connected to the said two ends.

3. The process of claim 1 wherein the current is applied for less than one second.

4. The process of claim 1 wherein the gimbal is held at its null position during said heating.

5. The process of claim 1 wherein said pick-up includes an armature fixed to the gimbal and a stator connected to said housing and wherein said armature is held centered in said stator during said heating.

6. The process of claim 1 wherein said torsion bar suspends one end of said gimbal and a rotatable shaft suspends the opposite end of said gimbal and wherein conductive probes are applied to said shaft and the outer end of said bar for said heating.

References Cited

UNITED STATES PATENTS

| | | | |
|---|---|---|---|
| 2,133,926 | 10/1938 | Ransom et al. | 219—50 X |
| 2,536,727 | 1/1951 | Crawley | 148—127 X |
| 2,721,952 | 10/1955 | Kenyon | 148—127 X |
| 2,805,577 | 9/1957 | Shomphe | 74—5 |
| 2,815,667 | 12/1957 | Waldstein | 74—5 |
| 2,839,930 | 6/1958 | Hayner | 74—5 |
| 2,945,380 | 7/1960 | Pope et al. | 74—5 X |
| 3,009,360 | 11/1961 | Morsewich | 74—5 |

CHARLIE T. MOON, Primary Examiner

U.S. Cl. X.R.

74—5; 148—127; 219—50